Fig. 9

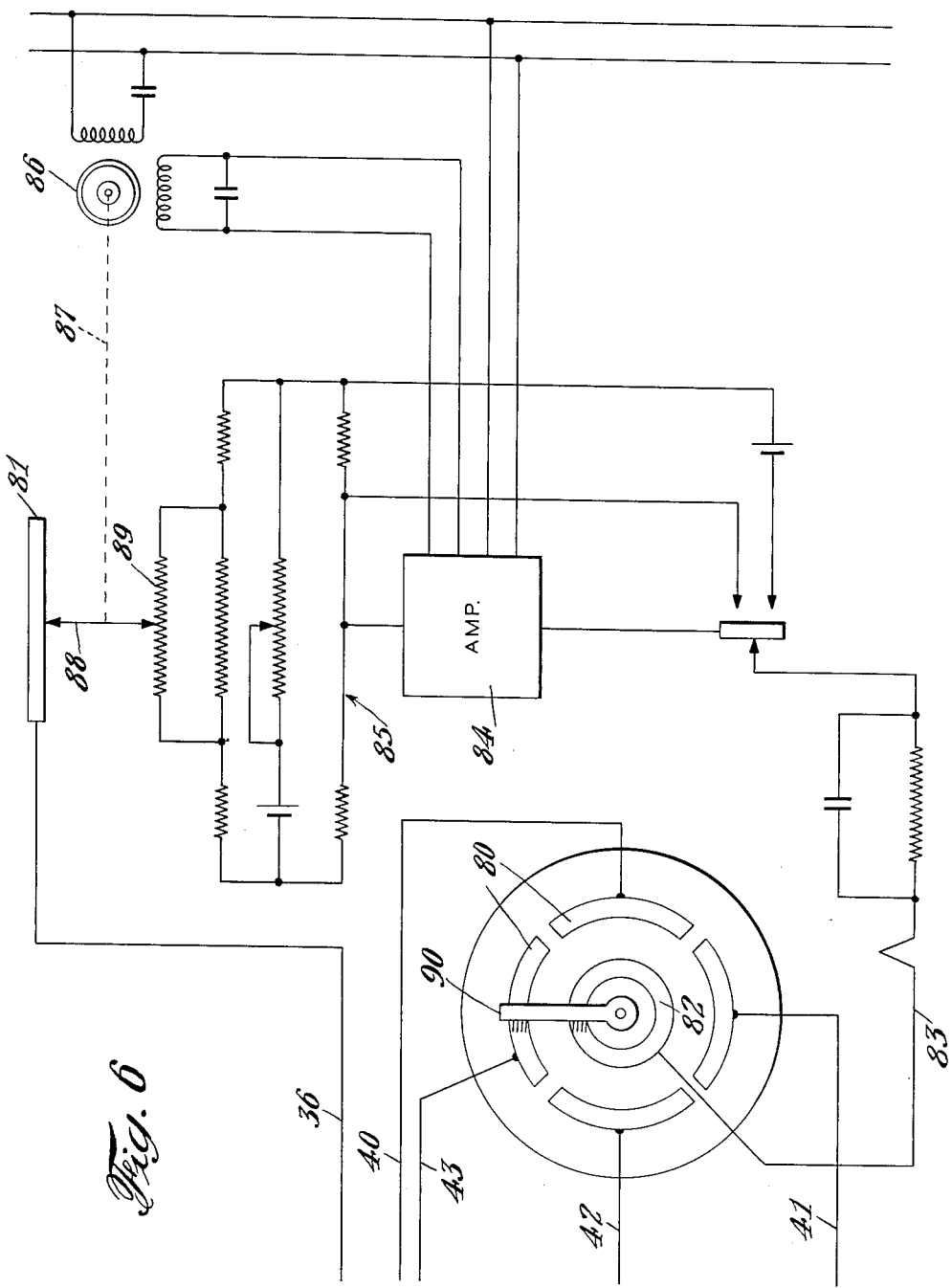

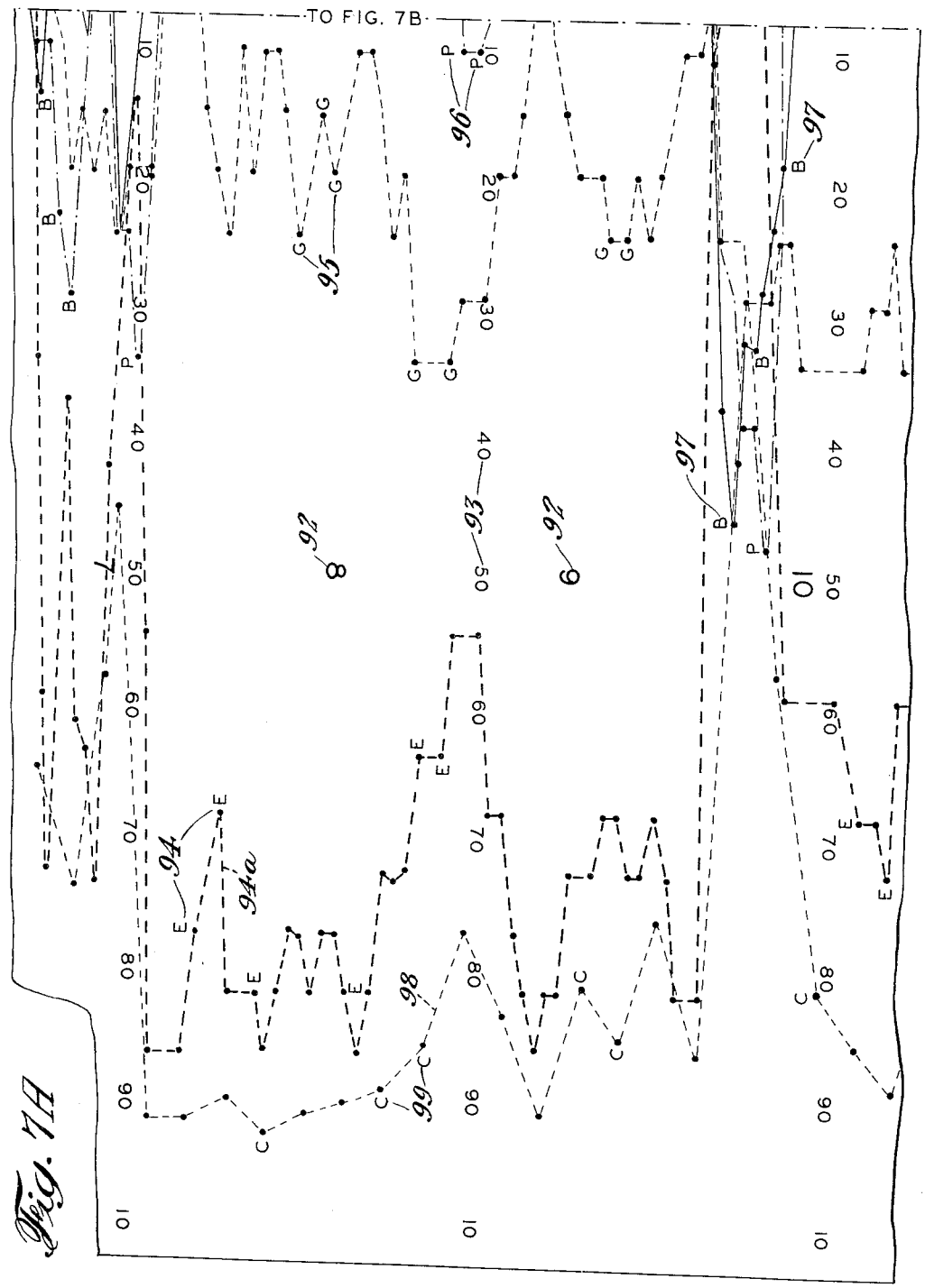

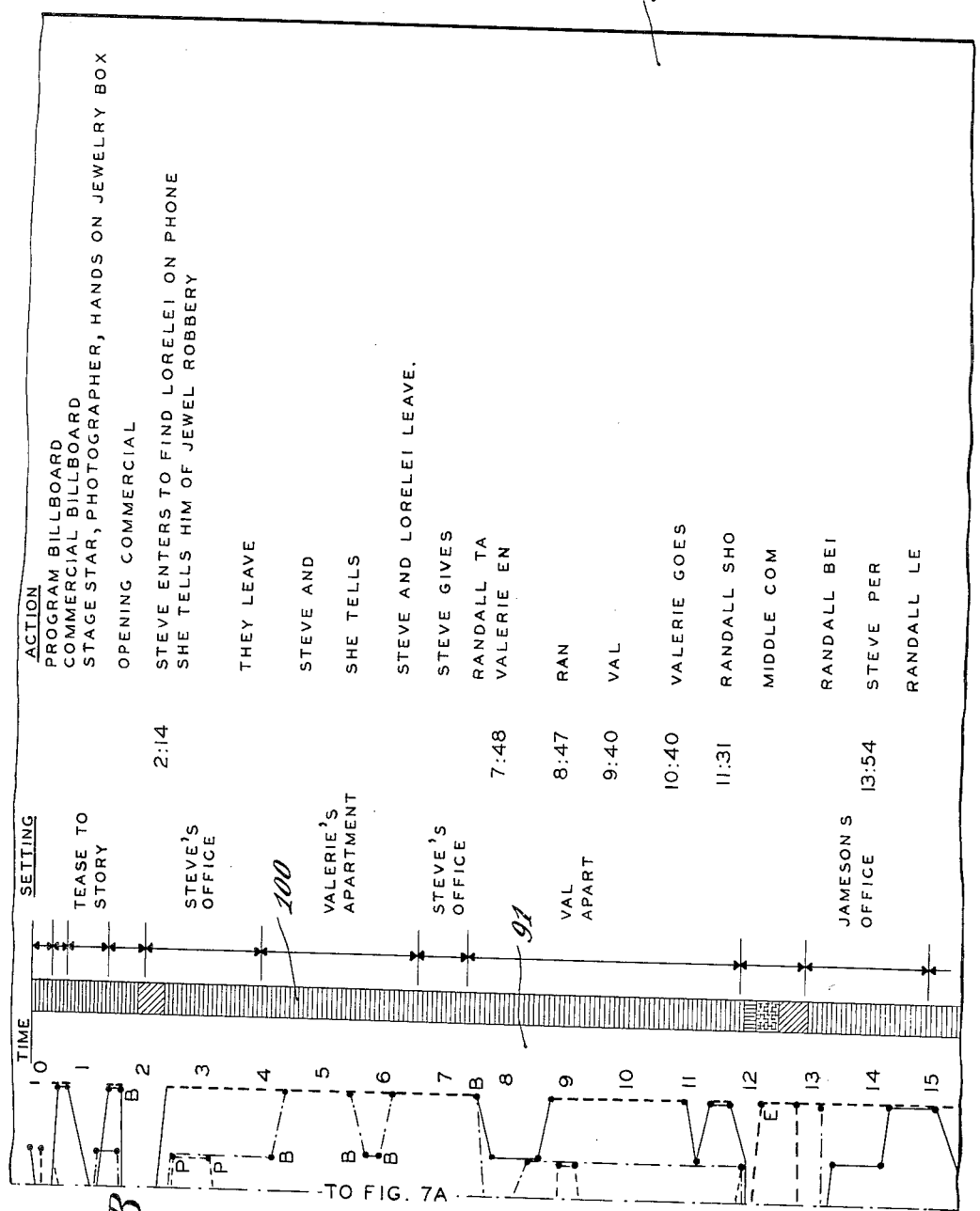

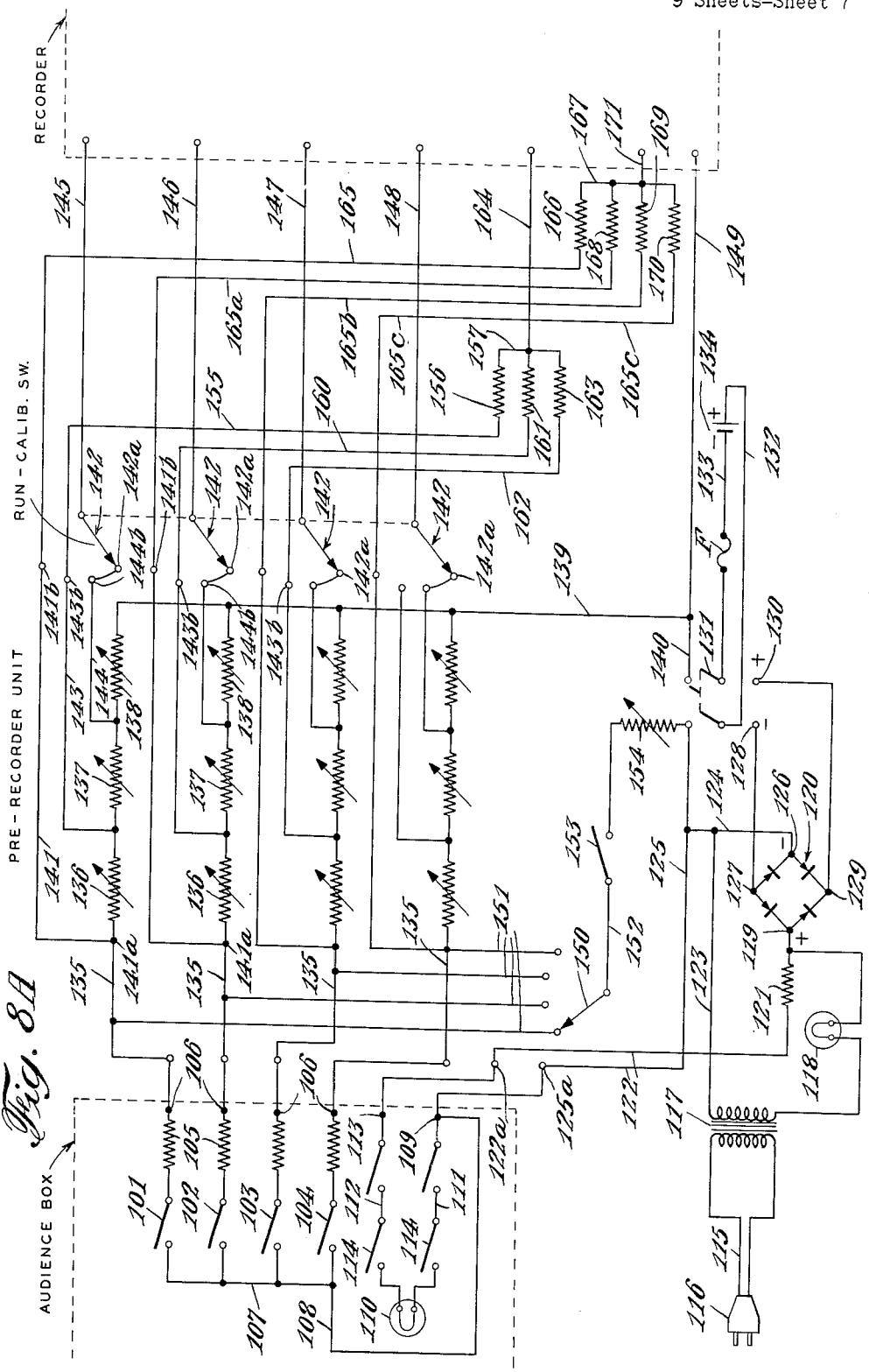

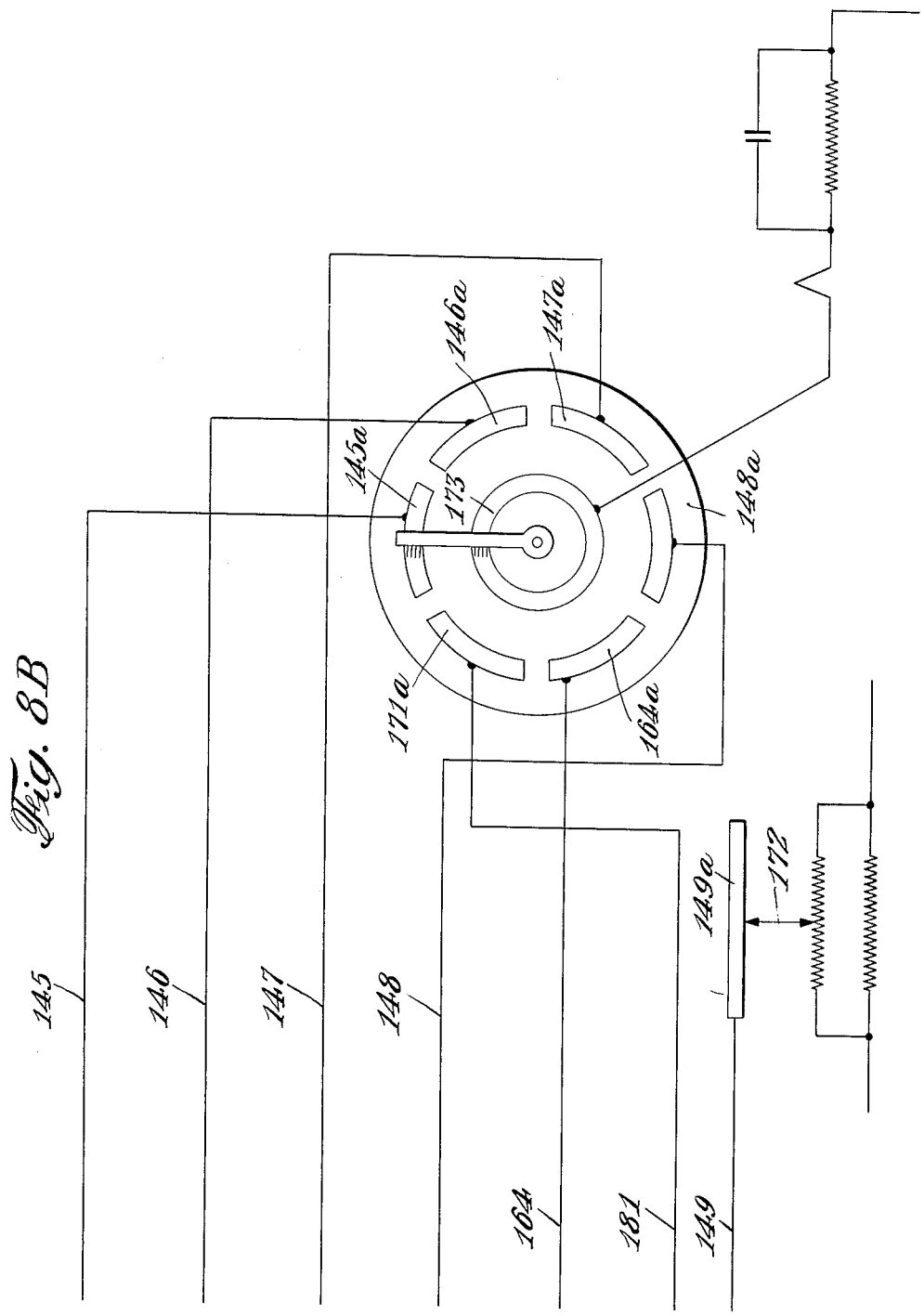

United States Patent Office 2,712,976
Patented July 12, 1955

2,712,976

AUDIENCE REACTION SYSTEM

Paul H. Blaustein and Franklin D. R. Wald, New York, and William J. Millard, Jr., Pelham Manor, N. Y.; said Blaustein and said Wald assignors to said Millard Application December 3, 1953, Serial No. 395,889

15 Claims. (Cl. 346—33)

This invention relates to a method of and apparatus for recording the reaction of an audience to a play or program being performed. It may be used in connection with the performance of a play or the reproduction of a moving picture show or the broadcast of a radio or television program, or any other form of public presentation. Members of the public viewing the performance are provided with suitable devices for designating their reactions to the performance in the course of the show, and electrical connections are provided from these devices to suitable indicating or recording apparatus.

An important object of the invention is the provision of means for designating various degrees of like and dislike or interest and disinterest, or any other reactions to the different incidents in or portions of the performance. These indications from a number of the viewing or listening audience are integrated so that the reactions of all of these persons in the audience to different portions of the performance may be noted and suitable revision may be made as to the script or action to meet with the approval of the audience in general. Heretofore systems have been tried by which members of the audience have been able to indicate approval or disapproval of portions of a show in the course of its performance, but these systems have not permitted an accurate determination of the true reaction of the audience. They have provided merely a general indication as to the overall reaction of the audience in terms of, for example, an average. In accordance with the present invention, however, an indication or record is provided as to what percentage of the audience reacts in each of, say, four different ways to different incidents in the performance. These reactions may, for example, be characterized as very interested, fairly interested, a little interested, and not at all interested, respectively. For convenience we may consider them as identified with the appraisals "excellent," "good," "poor," and "bad," respectively.

In the preferred embodiment of the invention a running chart or record is made with respect to the part or percentage of the audience which is reacting in each of the four different ways at periodic intervals throughout the performance. Also, if desired, an additional record may be made of the composite or net reaction of the entire audience at such periodic intervals. If the audience is relatively large, the system may be adapted to record the reactions of only a portion of the members of the audience. For example, any given percentage of the members of the audience may be provided with the necessary devices for expressing their reactions. If desired, the members of the audience provided with the reaction expressing devices may be appropriately selected to afford a suitable cross-section of the entire audience.

In lieu of the recording apparatus there may be employed appropriate indicating devices which provide merely an instantaneous visual indication of the percentage of the audience which is reacting in each of the different ways as the performance progresses. A composite or net indication may also be provided of the reaction of the entire audience or a selected portion of it. When such indicating devices are employed, one or more persons will continually observe the readings of the several indicators and may record the results noted in relation to time or to specific portions of the script being followed.

An important feature of the invention is the provision of a number of switch boxes, one to be held by each member of the audience whose reaction is to be recorded or indicated. Each switch box, in the preferred embodiment, is provided with four separate switches capable of being manually operated by rocking a lever or depressing a plunger, or in some other convenient way, to express which of the four categories of reaction the holder of the box desires to express. With each switch there is associated a resistance of a predetermined, relatively high value which is thrown into a circuit identified with that switch. The resistances identified with the several switches in all of the boxes should be of the same value. When a switch identified with a certain reaction is operated by one member of the audience, the related resistance is placed in parallel with the resistances of all other switch boxes having the corresponding switch operated by other members of the audience. An electric circuit is thus closed to suitable indicating or recording apparatus through an intermediate control box. The arrangement is such that the amount of current which will flow through the circuit thus closed will depend upon the number of switch box resistances which are thrown in parallel. In this circuit there is provided a predetermined but variable resistance of relatively low value and the indicating or recording apparatus is suitably connected to measure the drop of potential through this predetermined resistance. This drop of potential is directly proportional to the number of switch box resistances which are included in the particular circuit and, therefore, the indication or record made will provide the desired information as to the number of switches of a particular category that have been closed at a given instant. It will be understood that the same applies to the switches of the other categories, so that four separate indications or recordings will be made from which the number of switches of each category, or the relative numbers in the several categories, in operation at a particular time may be noted.

As mentioned above, the system may also provide a record or indication of the composite or net reaction of all holders of the switch boxes. For this purpose the indicating or recording means may be arranged for joint control by the four circuits which are closed through the various resistances in the plurality of switch boxes. The effect of the different circuits on the composite record or indication may be weighted differently through appropriate selection of resistances connected into the several circuits. Also, if desired, an additional indication or record may be made of the percentage of persons holding switch boxes who are actually registering their reactions at successive intervals. Should a number of holders of boxes not be registering their reaction, this will be revealed by this feature of the indicating or recording means. Without such additional record, however, the number of persons operating one of the switches in their switch boxes may be noted from the combined percentages of the different reactions being recorded at successive intervals. The extent to which the totals are less than 100% for all reactions will indicate the number of persons who refrained from expressing a reaction.

A further feature of the invention is the provision of a visual indication to each holder of a switch box as to whether or not his reaction is being expressed at any particular time. For this purpose each switch box may be provided with a small, readily visible light which is energized whenever none of the switches of the box is being held in closed position. This is a reminder to the holder that he should express his reaction by operating one of the switches. As soon as this is done, the light goes out.

In a modified form of the invention the switch boxes may each be provided with a single resistor which is selectively thrown into the desired circuit by operation of the related switch.

Other objects, features and advantages of the invention will appear from the detailed description of an illustrative embodiment of the same which will now be given in conjunction with the accompanying drawings, in which:

Fig. 6 is a schematic view and wiring diagram of a portion of a recorder which may be used in connection with the invention;

Figs. 7A and 7B show a section of a chart printed by the recorder in the course of a performance and means associated therewith to assist in analyzing the chart;

Figs. 8A and 8B are schematic views illustrating circuits by which the composite reaction of the audience and the percentage of box holders actually expressing their reactions may be recorded; and Fig. 9 is a schematic view, similar to Fig. 8B, illustrating a modified arrangement.

Figure 1:
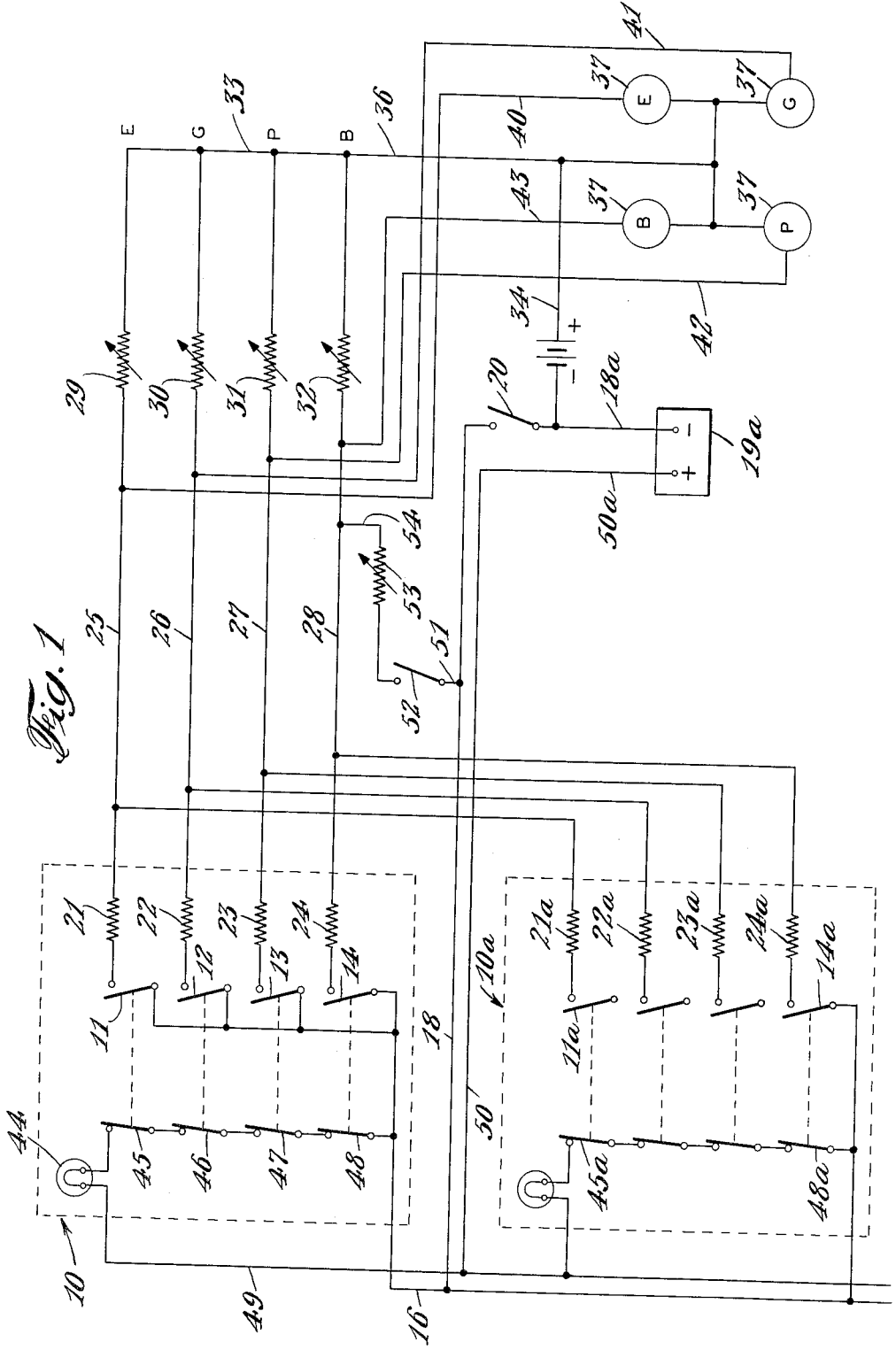
Fig. 1 is a circuit diagram showing schematically the interconnection of two switch boxes and their connection with suitable devices for indicating the audience reaction.

Referring now to Fig. 1, there is shown a relatively simple circuit diagram involving two switch boxes and the related circuits for providing the desired indication or record of the reactions of the holders of these boxes. As will be explained later, a large number of switch boxes may be similarly connected into the circuits identified with the four different types of reaction which may be expressed. Also the actual construction of a suitable form of switch box will be described in greater detail hereinafter.

The two switch boxes are indicated by the rectangular outlines 10 and 10a in Fig. 1. Both of the boxes are of the same construction and, therefore, a description of the circuits and devices within the box 10 will suffice for both. Similar parts in the box 10a are identified by the same reference number with an appended "a."

Four switches 11, 12, 13 and 14 are provided, these having one of their terminals connected with a common line 15. This common line is connected by a line 16 and a line 18 with one side of a source of direct current, such as a battery 19 or the like. A switch 20 may be provided in the line 18 to throw the system into and out of operation. The opposite terminals of the switches 11, 12, 13 and 14 are connected respectively with one of the terminals of resistors 21, 22, 23 and 24. The resistors, in turn, have their opposite terminals connected by lines 25, 26, 27 and 28, respectively, with one of the terminals of variable resistances 29, 30, 31 and 32, respectively. These resistances are made variable to conform with the requirements of the recording or indicating means and to take into account the number of switch boxes distributed through the audience. In the course of a performance these resistances will remain set at a predetermined value. The opposite terminals of these resistances are connected by a common line 33 and a branch line 34 with the opposite side of the battery 19. It will be seen from the foregoing that if the switch 11 is operated into closed position a circuit will be completed from the battery 19 through lines 18, 16, 15, switch 11, resistor 21, line 25, resistance 29 and lines 33 and 34 to the opposite side of the battery. Similarly, the closing of switches 12, 13 and 14 will complete circuits through their respective resistors 22, 23, and 24 and related resistances 30, 31 and 32.

It will be understood that the holder of box 10 is intended to operate only one of the switches so that only one of the four circuits described will be closed. At the same time one of the switches in box 10a may be operated to close one of the four circuits through the variable resistances 29, 30, 31, and 32. Assuming that switch 11 of box 10 and switch 11a of box 10a are operated by the respective holders of these boxes, the two related resistors 21 and 21a will be placed in parallel in the circuit which passes through the resistance 29. Thus from the end of line 18 a circuit will extend through lines 16 and 15 and switch 11 through resistor 21. At the same time, in parallel with this is a circuit from the line 18 through lines 16a and 15a and switch 11a and then through resistor 21a and a line 35 to a point along the line 25. When this occurs there will be substantially double the current flowing through the line 25 and resistance 29 as compared with the closing of only one of the switches, 11 or 11a. This is due to the fact that resistors 21, 22, 23, 24, 21a, etc. are all of relatively high value, for example 10,000 ohms, whereas the resistance 29 is of relatively low value, say between 2 and 6 ohms depending upon the calibration of the recording or indicating means hooked up with the system. The resistance of the balance of each circuit is thus negligible in comparison with the resistance of each of the several resistors 21, etc., so that when two of the latter are placed in parallel in a circuit extending through the resistance 29, substantially double the amount of current will flow as against the provision of only one resistor 21 in the circuit. Similarly, if three switch boxes are connected into the system in the same way and the switch 11 of each is closed, the current flow through the resistance 29 will be substantially trebled.

To provide an indication as to the number or relative number of switch boxes having the same switch, e. g. 11 and 11a in operation, it is simply necessary to indicate or record the voltage drop through the resistance 29. For this purpose the common line 33, which interconnects one of the ends of resistances 29, 30, 31 and 32, is connected by a line 36 to one terminal of each of a plurality of voltmeters or potentiometers 37. The opposite terminal of each of these devices is connected by a separate line to the opposite side of a respective one of the resistances 29–32. Thus a line 40 connects the voltmeter designated E with the opposite side of resistance 29, while a line 41 similarly connects the opposite terminal of the voltmeter designated G with the opposite terminal of resistance 30, and lines 42 and 43 connect their respective voltmeters with the opposite terminals of resistances 31 and 32. The several voltmeters may be identified with the reactions to be expressed, such as excellent, good, poor and bad indicated by the letters E, G, P, and B. According to the readings of the voltmeters at any given instant it may be determined whether the reaction of the holders of the switch boxes is generally favorable or generally unfavorable to the action taking place. Thus, assuming that a large number of switch boxes are connected into the system in the manner indicated, a relatively high voltage drop shown by voltmeter E will indicate that many members of the audience are reacting to express an appraisal of excellence. Similarly, a small voltage drop shown by voltmeter B will indicate that few of the switch box holders had appraised the particular incident as "bad."

In order to remind the holders of the several boxes to operate one of the switches when none is being operated at any particular time during a performance, a signal device is provided on each box. This may suitably be in the form of a small electric light 44 through which a circuit is closed whenever the holder of the box fails to operate any of the switches. For this purpose the circuit through the light 44 may include a plurality of switches 45, 46, 47 and 48 arranged in series. Switch 45 may be interconnected with switch 11 so as to open whenever the switch 11 is closed. Similarly switch 46 is opened whenever switch 12 is closed, switch 47 is opened whenever switch 13 is closed, and switch 48 is opened whenever switch 14 is closed. Spring means normally urge the switches 45–48 into closed position and the switches 11–14 into open position. Upon the manual closing of any one of the circuits expressing a reaction, the circuit through the light will be opened. One terminal of the light is connected through the series of switches 45–48, inclusive, to the line 16 and thence through line 18 and a branch line 18a to one side of an auxiliary source of current such as a battery 19a. The opposite terminal of the light is connected through lines 49, 50 and 50a with the opposite side of the battery 19a.

To facilitate conversion of the readings of the several voltmeters 37 into the number of persons expressing a particular reaction at a given time there may be provided a test circuit which may be closed prior to the commencement of the performance to indicate what reading on a voltmeter will correspond with a unanimous expression of a particular reaction. For this purpose a line 51 connected into line 18, and through the switch 20 with one side of the battery 19, may have its opposite end connected with one terminal of a resistor 53 of variable character. The opposite terminal of this resistor is connected through a line 54 with line 28. A switch 52 in the line 51 may be closed to complete a circuit from the battery through the resistor 53 and resistance 32 to the opposite side of the battery. Resistor 53 may be adjusted to equal the resistance of resistor 24 divided by the number of switch boxes distributed through the audience. Thus if fifty switch boxes are so distributed and the resistor 24 is of 10,000 ohms, the resistor 53 should be adjusted to 200 ohms. If desired a similar reading may be taken to indicate the result obtained from the operation of the same switch 14, for example, in half of the switch boxes distributed through the audience. Thus, in the example indicated, the resistor 53 may be adjusted to provide a resistance of 400 ohms. Corresponding readings may be obtained, as a preliminary to the commencement of a performance, with respect to each of the several voltmeters, if desired, by connecting the line 54 successively into lines 25, 26 and 27.

Figure 2:
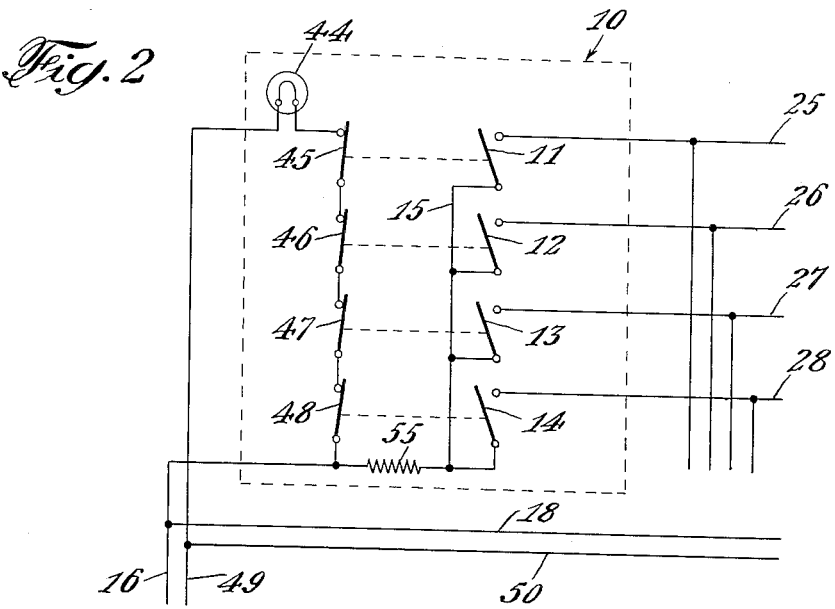
Fig. 2 is a schematic view illustrating the circuit connections within a modified form of switch box.

In Fig. 2 there is shown schematically a modified construction of one of the switch boxes by means of which the reaction of a member of the audience is expressed. In this modified construction the four resistors 21, 22, 23 and 24 are replaced by a single resistor 55. The latter is placed in the line 16, which, as explained, is connected by the line 18 through switch 20 to one side of the battery 19. Lines 25, 26, 27, and 28 are connected directly with one terminal of switches 11, 12, 13 and 14 respectively. In other respects the construction of the modified box and the circuits involved in it are the same as for the box 10 of Fig. 1. The arrangement is such that upon closing of any one of the switches 11, 12, 13 and 14, a circuit will be completed to the related line 25, 26, 27 or 28, and this circuit will include the resistor 55. It will be understood that a plurality of the boxes may be interconnected in the same manner as those of the Fig. 1 embodiment, and when so interconnected the resistors 55 of all boxes in which the switch 11, for example, has been closed will be thrown in parallel into the circuit which includes line 25 and variable resistance 29. Should the holder of one of the switch boxes inadvertently operate more than one of the switches 11, 12, 13 and 14, the reactions will be inaccurately indicated. This is, of course, undesirable, and therefore the holders of the switch boxes should be cautioned not to operate more than one switch at a time. If desired, a suitable interlock may be provided within the switch box to prevent the operation of more than one switch at a time. Interlocks of this character are well known in various key-operated devices.

Figure 3:
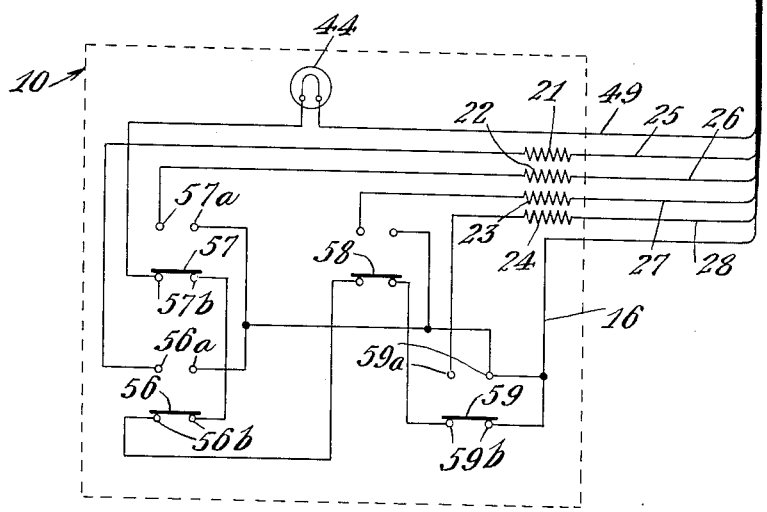
Fig. 3 is a schematic view illustrating more nearly the actual arrangement of the circuits and various elements in the switch boxes of Fig. 1.
Figure 4:
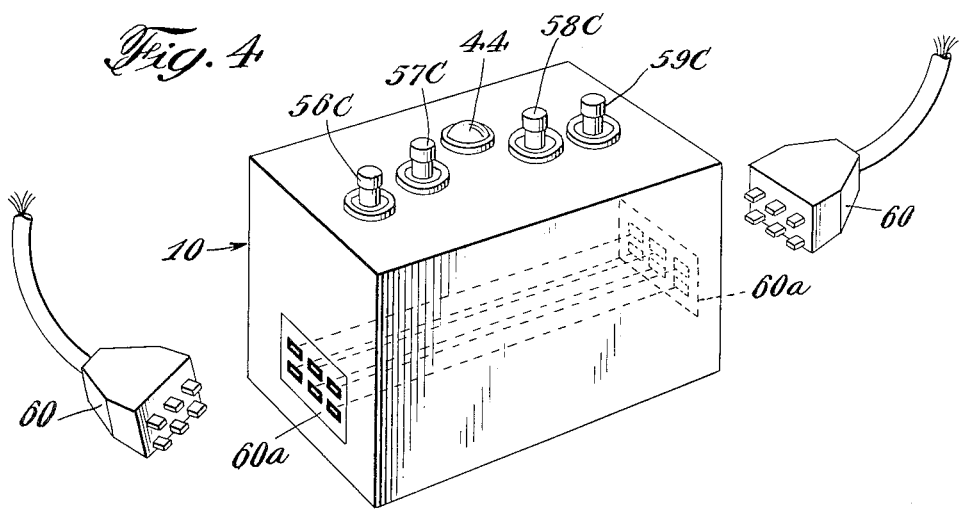
Fig. 4 is a perspective view of one of the switch boxes.

In Fig. 3 there is illustrated schematically, but more nearly in the preferred arrangement, the several parts of a switch box 10. Fig. 4 shows the outward appearance of one form of the box. If desired one side of the top of the box may be light in color, e. g. aluminum, and the other side dark, e. g. painted black. This will assist the holder in recalling the location of the favorable and unfavorable switches. Also the notations "excellent," "good," etc. may be applied adjacent the several switches. The resistors and the various lines electrically connecting the several elements of the switch box are designated by the same reference characters as the corresponding elements of Fig. 1. However, it will be noted that the lines 25, 26, 27 and 28, connected respectively with the resistors 21, 22, 23 and 24, and also the lines 16 and 49 which are common to several circuits, all enter the box at one side. Preferably a six wire cable is employed and this may carry at its outer end a six-prong plug 60, which is adapted to be inserted into a complementary receptacle, to be later described, mounted at an appropriate point adjacent the seat occupied by the holder of the switch box. If desired, the arrangement may be reversed and the cable may instead extend from a suitable junction box or the like fastened to the seat occupied by the holder of the switch box, and the six prong plug 60 may then be inserted in a complementary receptacle 60a (Fig. 4) mounted in the end wall of the switch box. Various other alternative schemes may be employed. Thus a single six-wire cable may have a plug at each end, one plug to be inserted in a receptacle at the pre-recorder and the other in a similar receptacle in one of the switch boxes. A number of six-wire branch lines from the same cable may similarly carry six-prong plugs at their ends for connection with other switch boxes. Or, if desired, each switch box may have a receptacle 60a at each end, as indicated schematically in Fig. 4, each adapted to receive a six-prong plug 60, the six contacts of each receptacle being connected in parallel with those of the other by six lines 60b within the box. Any number of switch boxes may then be interconnected by the use of six-wire cables having six-prong plugs 60 at each end, one plugged into one end of one box and the other plugged into the receptacle 60a of an adjacent box. The first box will then be connected by a similar cable with the pre-recorder. In this way as many switch boxes as desired may be connected one to another and then into the pre-recorder. There may, however, be a limit upon the total number of switch boxes in use due to possible overheating of that part of the cable which carries the current flowing through all of the switch boxes. The permissible number of boxes may be increased by using heavier cables, at least in that part of the system which carries the heaviest current load.

In Fig. 3, the switches 11 and 45 of Fig. 1 have been shown as replaced by a single switch bar 56 arranged, when in one position, to cooperate with the terminals 56a, to complete a circuit across these and through the resistor 21 to the line 25. In its other position the bar 56 cooperates with terminals 56b to interconnect these and thus partially complete a circuit through the light 44. Bar 56 is normally urged into the latter position. Upon manual operation of the bar 56, either by depressing a plunger or button 56c, or by operating a small lever on the top of the switch box, the circuit between the terminals 56b will be broken and a circuit between terminals 56a will be completed.

It will be understood that each of the other pairs of switches 12, 46, 13, 47 and 14, 48 is likewise replaced in Fig. 3 by a bar type switch similar to switch 56. Thus a bar 57 may cooperate with terminals 57a to complete a circuit through resistor 22 or it may cooperate with terminals 57b to assist in completing a circuit through the lamp 44. This is its normal position and it may be shifted to the opposite position by depressing a button 57c. Bar 58 will normally be urged by a spring into the position in which it assists in completing the circuit through the light 44, but may be manually operated by depressing a button 58c to break this circuit and to complete a circuit through the resistor 23. Similarly bar 59 is normally urged into the position tending to close the circuit through the light 44, but may be manually operated by depressing a button 59c to break this circuit and to complete the circuit between terminals 59a and thus place resistor 24, line 28, etc. in the circuit to the indicating or recording apparatus. Thus it will be seen that the bars 56—59 are normally held by suitable spring means in the position in which they are placed in series in a circuit that is thus closed through the light 44. Manual movement of any one of the bars will break the circuit through the light and complete a circuit through the related resistor.

Figure 5:
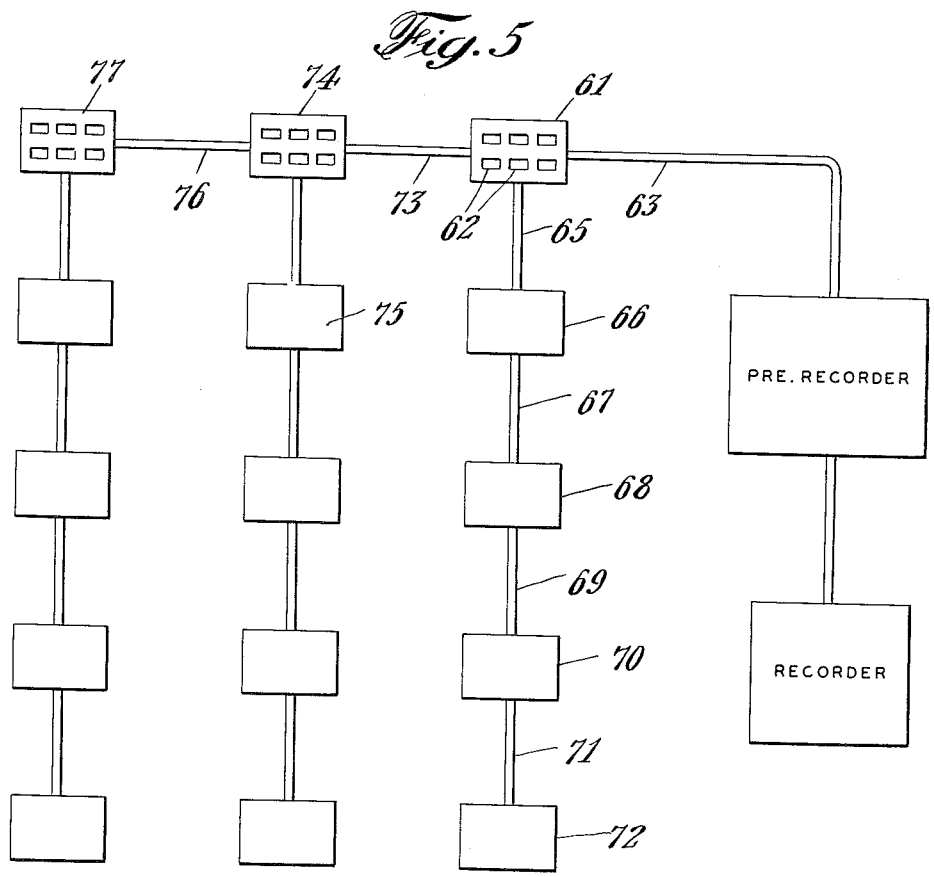
Fig. 5 is a schematic view illustrating the wiring system which may be used to interconnect a large number of switch boxes and connect these with a prerecorder and recorder.

Turning now to Fig. 5 there is shown schematically a wiring system by which a large number of switch boxes in the hands of persons in the audience may be connected to the indicating or recording apparatus by which their reactions are noted. In one arrangement which may be adopted, a receptacle 61 may be provided adjacent the seat of that member of the audience, provided with a switch box, who is positioned at the closest point to the recording apparatus. This receptacle 61 is provided with six openings 62 adapted to receive the prongs of the plug 60. Aligned with each of the openings 62 is a contact element arranged to engage the related prong. With each of these contacts is connected one wire of a six wire cable 63, the wires of this cable corresponding with lines 25, 26, 27, 28, 18 and 50 of Fig. 1. At their opposite ends the six wires of this cable are appropriately connected into suitable terminals within a pre-recorder 64 which houses the variable resistances 29, 30, 31, and 32 and the batteries 19 and 19a. It may also carry the switch 20 as well as switch 52 and the calibrating resistor 53 of Fig. 1. The six contacts within the receptacle 61 are connected through a six wire cable 65 to similar contacts within a receptacle 66 of the same construction as receptacle 61. Receptacle 66 is positioned adjacent the seat of another member of the audience provided with one of the switch boxes, who may then insert the plug 60 of his switch box into the openings of receptacle 66. Similarly the contacts of the latter are connected by a six wire cable to like contacts within a receptacle 68, and the latter are in turn connected by a six wire cable to similar contacts within a receptacle 70 which in turn is similarly connected through a six wire cable 71 to a receptacle 72. As many as desired of the receptacles of this character may be interconnected in this manner along a row or an aisle in a theater or other place of performance.

The contacts within the receptacle 61 are similarly connected by a cable 73 with like contacts within a receptacle 74 adjacent a seat in the next row or aisle in the theater. A corresponding number of receptacles 75 along this second row or aisle may be interconnected in the same manner as explained above. Another six wire cable 76 serves to connect the contacts within the receptacle 74 with a similar receptacle 77 adjacent a seat in the next row or aisle of the theater, and the latter is similarly interconnected with a number of other similar receptacles disposed adjacent the seats in that aisle or row. It will be apparent that this arrangement may be repeated to any extent desired so that any number of persons in the audience may be able to insert the plug 60 of a switch box into one of the receptacles and thus connect a desired number of the switch boxes with a pre-recorder in the manner explained.

A cable 78, which may be a six wire cable of which only five of the wires need be used, serve to connect the pre-recorder with the indicating means 37 of Fig. 1 or a recording unit 79. The wires of cable 78 correspond with wires 40, 41, 42, 43, and 36 of Fig. 1. In the recording unit each of the wires 40, 41, 42, and 43 is connected with a different one of four segment bars 80 (Fig. 6). Wire 36 is connected with a contact bar 81 forming part of a self-balancing slide wire potentiometer system. An annular contact member 82, concentric with the segment bars 80, is connected by a line 83 and various intermediate devices with an amplifier 84. The latter in turn is connected with the slide wire potentiometer system designated generally at 85. This system, which is of the self-balancing type, includes a motor 86 arranged to be driven in one direction or the other whenever a change occurs in the voltage delivered to the system from the pre-recorder. The armature of the motor is connected with a threaded or spirally grooved shaft 87 cooperating with a complementary member on a carriage 88 which is shifted by the rotation of shaft 87 to carry one contact along the contact bar 81 and another along a slide wire resistance 89. The arrangement is such that motor 86 will continue to turn in the appropriate direction until the potentiometer circuit becomes balanced through the shifting of the carriage 88. For further details as to the construction and operation of a system of this character, reference may be had to the patents to Wills, No. 2,423,540, granted July 8, 1947 and Wills, No. 2,559,383, granted July 3, 1951. An advantageous feature of the recorder of the latter patent is the provision of means for throwing out the balancing circuits while the printing wheel carrier is being operated to print upon the record sheet. It will be appreciated that the voltages being recorded are subject to change at any instant and the change may at times be substantial if some incident in a performance should bring about a sudden change in the reaction of the audience. For this reason it is preferable to employ a fixed-time-cycle printing recorder of the type sold by the Minneapolis Honeywell Company, as series 153x67. This is adapted to make a record about every two seconds, the printing wheel carriage being capable of shifting completely across the chart, if necessary, within that interval.

Recording apparatus of the character mentioned may be provided with a printing wheel carrying four indicia corresponding with the reactions to be recorded. These indicia may, for example, be 1, 2, 3 and 4, or E, G, P, and B to indicate "excellent," "good," "poor," and "bad." Means of well known character are provided in the recorder for turning the printing wheel to bring the indicia successively to the printing position in correlation with the selection of the circuit to be analyzed, as will now be explained. The apparatus includes an arm 90 adapted to be driven intermittently or continuously in a clockwise direction to interconnect the collector ring 82 successively with the several segment bars 80. In the position of the arm indicated in Fig. 6 the segment bar connected with the line 43 is placed in the circuit with the line 83 and accordingly the potentiometer system is controlled by the circuits closed upon the operation of those switches in the switch boxes which are identified with a "bad" reaction. The movement of the carriage 88 in response to the corresponding voltage will provide an indication as to the number or pecentage of the members of the audience who have operated the "bad" switch at the particular instant at which this reading is being taken. As the arm 90 moves to the next segment bar, it serves to connect into the potentiometer system the voltage delivered through the line 40 identified with the excellent reaction. Similarly, the other segment bars will become successively effecting as the arm 90 swings through its cycle.

It will be understood that a chart 91 (Fig. 7A) is intermittently advanced within the recorder in relation to the printing wheel so that a continuous record of the type shown will be formed. The longitudinally extending indicia 92 may be related to time and the transverse indicia 93 to voltage, which in turn is related to the number of persons expressing a particular reaction. If desired, the transverse indicia may show directly the number or percentage of persons expressing particular reactions. It will be understood that the several lines of characters, 94, 95, 96, and 97, identified with the various reactions may follow any course down the chart and may cross at various points. The character of the record made for each type of reaction should, therefore, be readily distinguishable from those made for the other types of reaction, either by use of the symbols indicated or other different forms of marking or different colors, or a combination of different markings and colors.

Various expedients may be employed for correlating the records produced on the chart of the recording apparatus described above with the performance being analyzed. As soon as the performance has been concluded the chart may be removed from the recorder and continuous lines may be drawn through the series of points representing each type of reaction expressed by the holders of the switch boxes, as shown in Figs. 7A and 7B. These lines may be drawn in various colors, for example the line 94a connecting the various recorded points "E," identified with the reaction "excellent," may be blue, while the line 95a connecting the points "G" identified with the reaction "good" may be red, that connecting the points "P" identified with the reaction "poor" may be green, and that connecting the points "B" identified with the reaction "bad" may be yellow. The chart may then be placed side by side in relation to a running description of the events involved in the performance, as indicated at 91a in Fig. 7B, so that each of the events will be alined properly with the time represented by the various recorded indicia on the chart. As a further aid to the interpretation of the chart, the composite reaction may be indicated by a further line 98, which may be plotted in the manner explained above after the chart has been removed from the recorder, by assigning different weights to the various reactions, such as 3, 2, 1, and 0 for "excellent," "good," "poor," and "bad" respectively. This line may be provided in any suitable distinguishing color. If the recorder is provided with the circuits, to be described, for automatically recording the composite reaction of the switch box holders at periodic intervals, it will simply be necessary to draw a line through the points so recorded. These are represented in Fig. 7A by the letter "C," as indicated at 99.

As a still further aid in analyzing the chart, a broad line or band 100 of varying colors may be drawn either along the edge of the chart or along the edge of the outline of the various incidents of the performance. This line may vary in color in accordance with the reaction which predominates on the chart at successive intervals. Thus at any time interval at which a reaction of "excellent" predominates, the broad line may be blue. When the reaction "good" predominates the line may change to red, and so on.

In the case of a performance which may be reproduced on a screen, with or without accompanying sound, a separate projector may be used to provide a frame around the projected picture which will vary in color to correspond with the reaction that has been expressed in relation to the various incidents that take place. The projector may simply be controlled manually by a person having before him the chart script and broad variable color band described above, and that person may then simply shift a slide within the projector to create a frame around the projected picture which corresponds with the color of the band on the chart identified with the prevalence of a particular reaction at a particular instant.

It will be understood that various other means may be employed for analyzing the recorded chart and for correlating this with the performance in connection with which it was made.

Referring now to Figs. 8A and 8B, there is shown a wiring diagram for a single switch box and a prerecorder unit with connections extending from the latter to the recorder. In general the arrangement is similar to that disclosed in the earlier drawings, but certain refinements are shown and provisions are made for controlling the recorder in accordance with the composite reaction of all switch box holders and for controlling the recorder to provide a record of the number or percentage of switch box holders who are expressing a reaction at successive time intervals. This automatic recording of the two additional values will serve to simplify the analysis of the resulting chart. While only one switch box is shown connected into the circuits, it will be understood that any suitable number of switch boxes will be connected into the system in the manner indicated in relation to Fig. 1.

Each switch box is provided with a plurality of switches, 101, 102, 103, and 104, identified respectively with the reactions to be expressed, i. e. excellent, good, bad, and poor. These switches are arranged for manual operation, in the manner already explained, either by rocking a lever or depressing a plunger. In series with each switch is a fixed resistance 105, each of these resistances being preferably 10,000 ohms. The end of each resistor 105 remote from the switch carries a contact member 106 alined with a slot in a receptacle, such as that indicated at 60a in Fig. 4, to receive one of the prongs of a six prong plug. The opposite sides of the several switches are interconnected by a line 107 which in turn is connected by a line 108 with a contact member 109 adapted to cooperate with another prong on the six prong plug. A pilot lamp 110, suitably disposed at the top of the switch box, has one terminal connected by a line 111 with the contact member 109, and the opposite terminal connected by a line 112 with a contact member 113 arranged to cooperate with another prong on the plug. Four switches 114 are arranged in series in the circuit through the lamp 110, each of these switches being connected for operation by the manual means for operating a related one of the switches 101–104. This arrangement is such that the light circuit will be closed only so long as none of the switches 101–104 is being operated by the switch box holder.

Current for operating the system may be derived from any suitable power source through a two wire cable 115 having a plug 116 at its end adapted for connection with a conventional outlet receptacle. Power is delivered by the cable 115 to a transformer 117 arranged to step down the voltage to any desired extent. One terminal of the outlet of the transformer is connected through a pilot lamp 118 with a terminal 119 of a rectifier 120. Terminal 119 is also connected through a resistor 121, which may suitably be of one ohm resistance, and a line 122 with a contact 122a which may suitably be that prong of a six prong plug adapted for cooperation with the contact member 113. The opposite side of the output of the transformer is connected by lines 123, 124 and 125 with a contact element 125a, which may suitably be the number 6 prong on the six prong plug which is arranged for cooperation with the contact member 109. It will be apparent that through the connections described alternating current of suitable voltage will be delivered to the pilot lamp 110 whenever all four of the switches 114 are closed.

Turning now to the rectifier, a contact 126 thereon is connected with the line 124 to receive current from one side of the transformer. Another contact 127 of the rectifier is connected with a terminal 128 while a further contact 129 of the rectifier is connected wth a terminal 130. The terminals 128 and 130 are arranged to co-operate with a double throw switch member 131 when the latter is thrown downwardly. At this time current will be supplied through lines 132 and 133 to a storage battery 134. This is preferably a two volt battery. It will be understood that the operation of the rectifier is such that the alternating current will be rectified and direct current will be delivered to the terminals 128 and 130. Switch 131 will, of course, be thrown to its lower position only during periods in which the apparatus is not in use so that the battery will be fully charged when the apparatus is subsequently used.

Each of the contact members 106 is connected with a separate line 135 of a six wire cable, whenever a six prong plug carried by the cable is inserted in the receptacle 60a of the switch box. Three variable resistors 136, 137, and 138 are provided in series in each of the lines 135. The end terminals of resistors 138 are interconnected by a line 139 which in turn is connected with a line 140. When the double throw switch 131 is closed in its upper postion a circuit is thus completed from the battery 134 through whichever one of the switches 101—104 may be closed by the switch box holder. Thus assuming that switch 101 has been closed, the circuit extends from the battery through line 132, switch 131, line 125, line 108, line 107, switch 101, resistor 105, line 135, resistors 136, 137 and 138, lines 139 and 140, the opposite arm of switch 131, and then the line 133 back to the battery. It will be understood that similar circuits are completed through other switch boxes, and that all such circuits identified with the same switch, such as 101, in all boxes will be connected in parallel up to some point in advance of the resistors 136, 137 and 138. The latter will receive all of the current flowing through all of the corresponding switches, such as 101, operated in the plurality of boxes.

A line 141 connected to the uppermost line 135 (Fig. 8A) at a point 141a, in advance of resistor 136, extends to a terminal 141b of a multiple contact switch 142 having a swingable contact arm. Similarly a line 143 extends from a point between resistors 136 and 137 to another terminal 143b of the multiple contact switch 142. So also a line 144 extends from a point between the resistors 137 and 138 to a further terminal 144b of the switch 142. Normally the switch arm 142 will be engaged with a contact 142a which is connected by a line, as shown, with the contact 144b. Similar connections are provided in each of the lines 135 to related contacts of similar switches 142 in the corresponding circuits identified with the other switches 102, 103 and 104. Normally all of the switch arms 142 are engaged with the contacts 142a in all of these circuits.

The foregoing resistors and connections are provided in a pre-recorder unit which is in turn connected with the recorder in the manner now to be explained. From the central contact of the switch arm of the uppermost switch 142 a line 145 extends to a segment 145a (Fig. 8B) of a six segment selector or commutator in the recorder. Similarly lines 146, 147 and 148 extend to segments 146a, 147a and 148a, respectively of the selector or commutator. The recorder may be similar to that described in relation to Fig. 6 but it is capable of recording successively six different potentials. The common line 139 which interconnects the right hand ends of the four resistors 138 is connected through a line 149 with a contact bar 149a in the recorder, this bar being similar to the bar 81 of Fig. 6.

To facilitate calibration of the recorder, in the manner explained in relation to the earlier described embodiments, a four contact switch 150 is provided. Each of the four contacts of this switch is connected with a different one of the lines 135 at a point between the contact members 106 and the resistors 136. The central terminal of the switch is connected by a line 152, a throw-in switch 153, and a variable resistor 154 with the line 125. Resistor 154 is preferably capable of adjustment from zero to 1,000 ohms. As previously explained, if fifty switch boxes are to be placed in operation, the resistor 154 will be set at 200 ohms, which will correspond with operation of like switches in all of the fifty boxes. The current from battery 134 may then be passed successively through the different lines 135 by shifting the switch 150 from one contact to another and a recording may be made by the recorder for calibration purposes.

If the switch arms 142 are at this time in the positions indicated in Fig. 8A the recorded data will indicate the drop of potential through the resistor 138 of the particular circuit selected by the switch 150. By shifting the switch arms 142 to contacts 143b, calibration may be effected in relation to the potential drop through the two resistors 137 and 138 for the successive circuits selected by the switch 150. Similarly if the switch arms 142 are shifted to the contacts 141b, calibration may be effected with respect to the potential drop through the three resistors 136, 137 and 138 for the successive circuits selected by the switch 150. The resistors 136, 137 and 138 will be adjusted for each of the circuits to insure a like reading for a given setting of resistor 154. After appropriate calibration of the recorder the switch arms 142 will be returned to their contacts 142a and the switch 153 will be opened so that the switch boxes may exercise their control.

For the purpose of controlling the recorder to provide a composite indication of the audience reaction, the contact 143b for the uppermost switch 142 is connected by a line 155 with a resistor 156 which may suitably be 400 ohms. The opposite end of this resistor is connected by a line 157 with other like resistors, to be described. Contact 143b for the next switch 142 is connected through a line 160 with one end of a resistor 161. The opposite end of this resistor is connected with the line 157. Similarly, contact 143b of the next lower switch 142 is connected through line 162 with one end of a resistor 163, the opposite end of which is connected with the common line 157. Resistors 156, 161 and 163 have any desired, predetermined relation to each other for the purpose of weighting the different reactions. Thus they may be, respectively, 400, 600 and 1,200 ohms.

The common line 157 which connects the outer ends of the three resistors is connected by a line 164 with a fifth segment 164a on the selector (Fig. 8B). As will be explained, this provides for control of the recorder in accordance with the weighted composite of all reactions expressed as the rotating arm of the selector reaches the segment 164a. It will be noted that the voltage drop which will be measured at this time is that of the current flowing in parallel through the resistors 156, 161 and 163 and through the resistors 137 and 138 of the three circuits identified with the three reactions of "Excellent," "Good" and "Poor." No weight is given to the reaction "Bad." The selection of the magnitude of the resistances of the various resistors involved in this combined circuit is such that the measurement recorded will be on the higher voltage region of the chart so as to place these recordings beyond the usual range of the recordings for the different reactions. Thus the points identified with the composite record will fall substantially along the line 98 of Fig. 7A.

A similar arrangement of circuits may be provided to effect a periodic recording of the percentage of switch box holders who are expressing a reaction at a particular instant. For this purpose, a line 165 (Fig. 8A) extends from contact 141b of the uppermost switch 142 to a resistor 166, the opposite end of which is connected to a line 167. Similarly the contact 141b of the next lower switch is connected by a line 165a to a resistor 168 which has its opposite end connected with the line 167. So also the contacts 141b for the two lower switches are connected by lines 165b and 165c, respectively with resistors 169 and 170. The opposite ends of these resistors are likewise connected with the common line 167. All of the resistors 166, 168, 169, and 170 are of the same value, for example 500 ohms, so that equal weight is given to the current flowing through the several circuits 135. The line 167, which interconnects the right end (Fig. 8A) of all of these resistors, is connected by a line 171 with a segment 171a of the selector or commutator in the recorder (Fig. 8B). This arrangement is such that when the rotating arm of the selector reaches the sixth commutator segment, the recording apparatus will be controlled in accordance with the drop of potential through the parallel circuits extending through the four sets of resistors 136, 137 and 138 and the respective resistors 166, 168, 169, and 170. Since the latter resistors are of equal magnitude, equal weight will be given to the current flowing through the several lines 135 so that the potential drop recorded upon the engagement of the selector arm with the commutator segment 171a will be proportional to the total number of switches 101, 102, 103, and 104 which are being operated in all of the switch boxes at that particular instant. The values of the resistances of the various resistors 136, 137, 138, 166, 168, 169, and 170 which are in the circuit at this time may be such that the recorded voltage drop will fall in an area of the chart which is largely or entirely either to the left or to the right (Fig. 7A) of the recordings of the composite reaction. If all of the switch box holders are operating one or another of the switches in their boxes throughout the performance, the indicia indentified with segment 171a will fall along a straight line down the chart. Any deviation from this straight line will indicate the percentage of the switch box holders who are not operating any of the switches at a particular instant.

It will be understood that the recorder may suitably be of the same general character as that described in relation to Fig. 6 and is provided with the same general circuits and instrumentalities as the latter. However, it is capable of recording successively, at periodic intervals, six variable potentials which are identified with the four different reactions, the composite reaction, and the percentage of switch box holders who are expressing a reaction. As the revolving arm of the selector engages the commutator segments successively, a contact member 172, similar to member 88 of Fig. 6, is shifted automatically to effect a balance of potential within the recorder and bring about a recording of the appropriate one of a series of six symbols in the proper position across the chart. The position of the contact member 172 and the associated printing wheel at the time of a recording is determined by the difference in potential between the plate 149a and the particular segment of the selector which is connected with the annular contact 173 at that time by the rotating arm of the selector.

Figure 9:
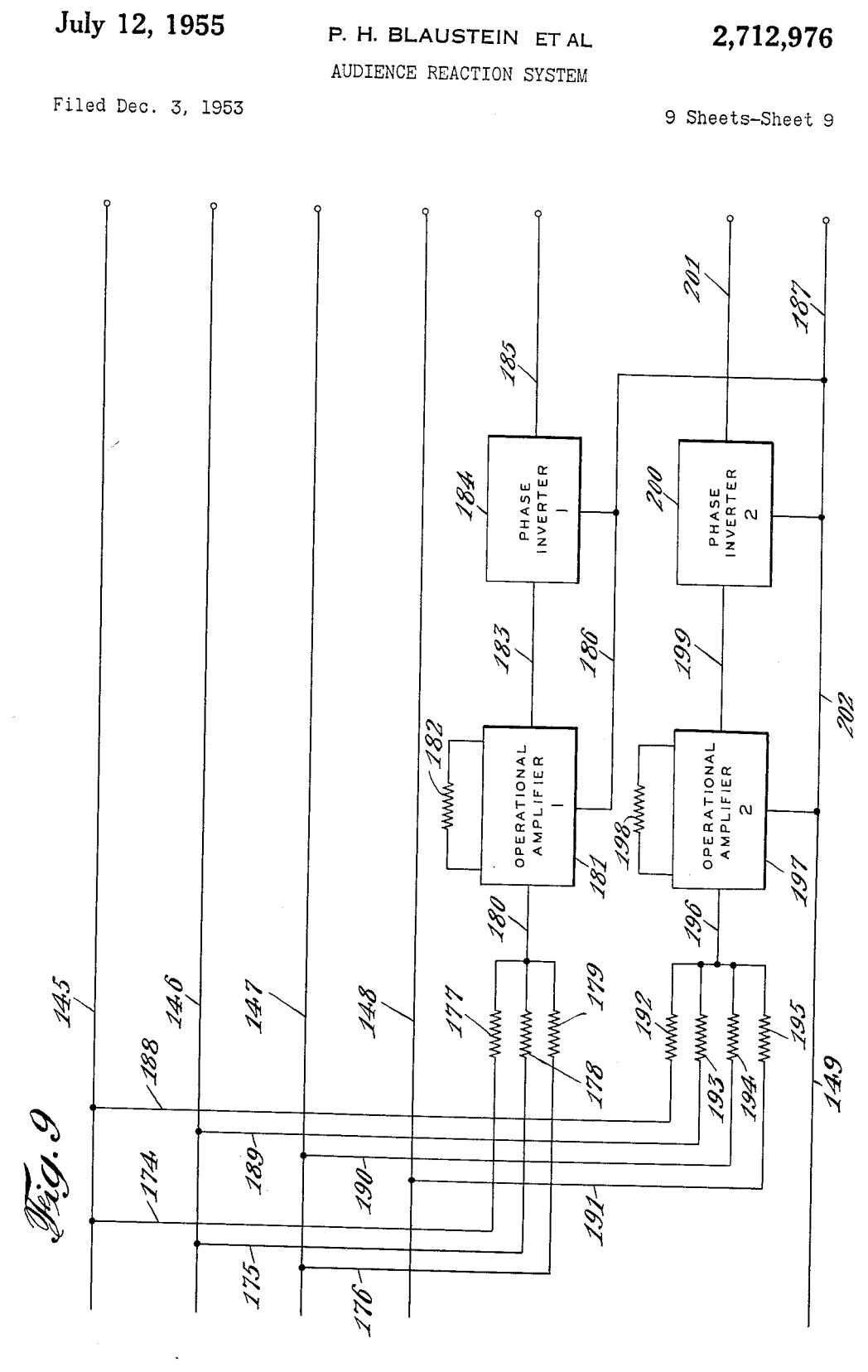

In Fig. 9 there is shown a modified arrangement of circuits and devices for transmitting to the recorder the potentials to be measured. With this arrangement the resistors 136 and 137 and also the several lines 141 and 143 as well as the switches 142 may be omitted from the pre-recorder. The several lines 135 are connected directly to the variable resistors 138 of Fig. 8A and the lines 144 are connected directly with the respective lines 145, 146, 147, and 148. These are then connected with the respective segments of the selector or commutator as explained in connection with Fig. 8B. Lines 145, 146, and 147 are connected by lines 174, 175, and 176 with one end of a respective resistor 177, 178 and 179, which correspond with the resistors 156, 161, and 163 of Fig. 8A and may be of the same value, i. e. 400, 600, and 1,200 ohms, respectively. The opposite ends of the resistors 177, 178, and 179 are connected with a common line 180 which extends to an operational amplifier 181 of well known construction, having appropriate electronic circuits therein. Shunted across the operational amplifier is a resistance 182. A line 183 connects the operational amplifier 181 with a phase inverter 184, of well known construction, which is connected by a line 185 with the fifth segment of the selector. The line 185 corresponds with line 164 of Fig. 8B. A line 186 serves to connect the operational amplifier 181 and the phase inverter 184 with a common line 187 which is connected with the line 149 of Fig. 8B and is connected with the contact plate 149a of the recorder.

Similarly, to effect a recording of the percentage of switch box holders who are operating one of the switches in their boxes, the lines 145, 146, 147 and 148 are connected by lines 188, 189, 190 and 191 with one terminal of resistors 192, 193, 194 and 195, respectively. These resistors are of the same value and may each suitably be of 500 ohms resistance. The opposite terminals of these resistors are connected to a common line 196 which extends to an operational amplifier 197 having a resistance 198 shunted across it. A line 199 connects the operational amplifier with a phase inverter 200 which is connected by a line 201 with the sixth segment of the selector. Line 201 corresponds with line 171 of Fig. 8B. A line 202 serves to connect another terminal of the operational amplifier 197 with another terminal of phase inverter 200 and with the common line 187.

By appropriate adjustment and control of the operational amplifiers 181 and 197, the indicia recorded when the rotating arm of the selector engages the fifth and sixth commutator segments may be caused to call in the desired regions across the chart of the recorder; this may, if desired, be largely or entirely outside of the area in which the separate reactions are recorded.

While a preferred embodiment of the invention and some modifications thereof have been described in considerable detail, it should be understood that other changes may be made in the construction and arrangement of the several parts and features within the scope of the appended claims.

What is claimed is:

1. An audience reaction system comprising a plurality of switch boxes each adapted to be held by a member of the audience, a plurality of switches in each of said boxes, each switch being identified with a particular reaction experienced by the holder of the box, manual means for operating the several switches, separate electric circuits each arranged to be closed upon operation of one of the switches, a plurality of resistors of predetermined value in each of said boxes, each of said resistors being arranged to be placed in one of said circuits upon operation of the related switch, electrical interconnections between the plurality of switch boxes serving to place in parallel in each of said circuits the resistors related to like switches operated by the holders of said boxes, a common resistor of predetermined value in each of said circuits arranged in series with the first mentioned resistors which are connected in parallel, and means for measuring the drop of potential across each of said common resistors.

2. An audience reaction system comprising a plurality of switch boxes each adapted to be held by a member of the audience, a plurality of switches in each of said boxes, each switch being identified with a particular reaction experienced by the holder of the box, manual means for operating the several switches, separate electric circuits each arranged to be closed upon operation of one of the switches, a plurality of resistors of predetermined value in each of said boxes, each of said resistors being arranged to be placed in one of said circuits upon operation of the related switch, electrical interconnections between the plurality of switch boxes serving to place in parallel in each of said circuits the resistors related to like switches operated by the holders of said boxes, a common resistor of predetermined value in each of said circuits arranged in series with the first mentioned resistors which are connected in parallel, and means for periodically recording the drop of potential across each of said common resistors.

3. An audience reaction system comprising a plurality of switch boxes each adapted to be held by a member of the audience, a plurality of switches in each of said boxes, each switch being identified with a particular reaction experienced by the holder of the box, manual means for operating the several switches, separate electric circuits each arranged to be closed upon operation of one of the switches, a plurality of resistors of predetermined value in each of said boxes, each of said resistors being arranged to be placed in one of said circuits upon operation of the related switch, electrical interconnections between the plurality of switch boxes serving to place in parallel in each of said circuits the resistors related to like switches operated by the holders of said boxes, a common resistor of predetermined value in each of said circuits arranged in series with the first mentioned resistors which are connected in parallel, and means for measuring the drop of potential across each of said common resistors, said common resistor being of substantially lower resistance than each of said resistors in said boxes.

4. An audience reaction system comprising a plurality of switch boxes each adapted to be held by a member of the audience, a plurality of switches in each of said boxes, each switch being identified with a particular reaction experienced by the holder of the box, manual means for operating the several switches, separate electric circuits each arranged to be closed upon operation of one of the switches, a plurality of resistors of predetermined value in each of said boxes, each of said resistors being arranged to be placed in one of said circuits upon operation of the related switch, electrical interconnections between the plurality of switch boxes serving to place in parallel in each of said circuits the resistors related to like switches operated by the holders of said boxes, a common resistor of predetermined value in each of said circuits arranged in series with the first mentioned resistors which are connected in parallel, means for measuring the drop of potential across each of said common resistors and calibrating means for said measuring means comprising a further resistor arranged to be placed in each of said circuits at will, said further resistor having a value equal to that of one of the resistors in said boxes divided by the number of boxes being held by members of the audience.

5. An audience reaction system comprising a plurality of switch boxes each adapted to be held by a member of the audience, a plurality of switches in each of said boxes, each switch being identified with a particular reaction experienced by the holder of the box, manual means for operating the several switches, separate electric circuits each arranged to be closed upon operation of one of the switches, a plurality of resistors of predetermined value in each of said boxes, each of said resistors being arranged to be placed in one of said circuits upon operation of the related switch, electrical interconnections between the plurality of switch boxes serving to place in parallel in each of said circuits the resistors related to like switches operated by the holders of said boxes, a common resistor of predetermined value in each of said circuits arranged in series with the first mentioned resistors which are connected in parallel, and a multiple print recorder arranged to print periodically on a chart a designation identified with each of said circuits in a position across the chart corresponding with the drop of potential across the related common resistor at the time of each periodic printing.

6. An audience reaction system comprising a plurality of switch boxes each adapted to be held by a member of the audience, a plurality of switches in each of said boxes, each switch being identified with a particular reaction experienced by the holder of the box, manual means for operating the several switches, separate electric circuits each arranged to be closed upon operation of one of said switches, a resistor of predetermined value in each of said boxes arranged to be placed in one of said circuits upon operation of the related switch, electrical interconnections between the switch boxes serving to place in parallel the resistors in all of said boxes which have corresponding switches closed in the circuits closed by said switches, a common resistor of predetermined value in each of said circuits arranged in series with the first mentioned resistors which are connected in parallel, and means for measuring the drop of potential across each of said common resistors.

7. An audience reaction system comprising a plurality of switch boxes each adapted to be held by a member of the audience, a plurality of switches in each of said boxes, each switch being identified with a particular reaction experienced by the holder of the box, manual means for operating the several switches, separate electric circuits each arranged to be closed upon operation of one of the switches, a plurality of resistors of predetermined value in each of said boxes, each of said resistors being arranged to be placed in one of said circuits upon operation of the related switch, electrical interconnections between the plurality of switch boxes serving to place in parallel in each of said circuits the resistors related to like switches operated by the holders of said boxes, a common resistor of predetermined value in each of said circuits arranged in series with the first mentioned resistors which are connected in parallel, means for measuring the drop of potential across each of said common resistors, a plurality of resistance elements, each shunted across one of said common resistors and of substantially greater value than the latter, one terminal of said plurality of resistance elements being interconnected, and means for measuring the drop of potential across all of said resistance elements and the related common resistors.

8. An audience reaction system comprising a plurality of switch boxes each adapted to be held by a member of the audience, a plurality of switches in each of said boxes, each switch being identified with a particular reaction experienced by the holder of the box, manual means for operating the several switches, separate electric circuits each arranged to be closed upon operation of one of the switches, a plurality of resistors of predetermined value in each of said boxes, each of said resistors being arranged to be placed in one of said circuits upon operation of the related switch, electrical interconnections between the plurality of switch boxes serving to place in parallel in each of said circuits the resistors related to like switches operated by the holders of said boxes, a common resistor of predetermined value in each of said circuits arranged in series with the first mentioned resistors which are connected in parallel, a multiple print recorder arranged to print periodically on a chart a designation identified with each of said circuits in a position across the chart corresponding with the drop of potential across the related common resistor at the time of each periodic printing, a plurality of resistance elements and an operational amplifier arranged to combine the potential drops across all of said common resistors, and connections from said operational amplifier and said common resistors to said multiple print recorder for controlling the same to print a designation identified with said combined potential drops in a position across the chart corresponding with said combined potential drops during each cycle of said multiple print recorder.

9. An audience reaction system comprising a plurality of switch boxes each adapted to be held by a member of the audience, a plurality of switches in each of said boxes, each switch being identified with a particular reaction experienced by the holder of the box, manual means for operating the several switches, separate electric circuits each arranged to be closed upon operation of one of said switches, fixed resistance means in each of said boxes, connections from said resistance means to said switches serving to place a fixed resistance of predetermined high value in one of said circuits upon operation of the related switch, electrical interconnections between the switch boxes serving to place in parallel said fixed resistances in all of said boxes which have corresponding switches closed in the circuits closed by said switches, a common resistor of predetermined low value in each of said circuits arranged in series with the fixed resistances which are connected in parallel, and means for measuring and providing an indication of the drop of potential across each of said common resistors.

10. An audience reaction system comprising a plurality of switch boxes each adapted to be held by a member of the audience, a plurality of switches in each of said boxes, each switch being identified with a particular reaction experienced by the holder of the box, manual means for operating the several switches, separate electric circuits each arranged to be closed upon operation of one of said switches, fixed resistance means in each of said boxes, connections from said resistance means to said switches serving to place a fixed resistance of predetermined high value in one of said circuits upon operation of the related switch, electrical interconnections between the switch boxes serving to place in parallel said fixed resistances in all of said boxes which have corresponding switches closed in the circuits closed by said switches, a common resistor of predetermined low value in each of said circuits arranged in series with the fixed resistances which are connected in parallel, means for measuring and providing an indication of the drop of potential across each of said common resistors, a resistance element in series with each of a plurality of said common resistors, said resistance elements having one of their terminals interconnected, and means for measuring and providing an indication of the drop of potential across all of said resistance elements and the related common resistors.

11. An audience reaction system comprising a plurality of switch boxes each adapted to be held by a member of the audience, a plurality of switches in each of said boxes, each switch being identified with a particular reaction experienced by the holder of the box, manual means for operating the several switches, separate electric circuits each arranged to be closed upon operation of one of said switches, fixed resistance means in each of said boxes, connections from said resistance means to said switches serving to place a fixed resistance of predetermined high value in one of said circuits upon operation of the related switch, electrical interconnections between the switch boxes serving to place in parallel said fixed resistances in all of said boxes which have corresponding switches closed in the circuits closed by said switches, a common resistor of predetermined low value in each of said circuits arranged in series with the fixed resistances which are connected in parallel, means for measuring and recording the drop of potential across each of said common resistors, a plurality of resistance elements each in series with one of said common resistors, said resistance elements having one of their terminals interconnected and having a predetermined weighted relationship, a second plurality of resistance elements of the same value, each in series with one of said common resistors, and means for measuring and recording the drop of potential across each of said plurality of resistance elements and their related common resistors.

12. An audience reaction system comprising a plurality of switch boxes each adapted to be held by a member of the audience, a plurality of switches in each of said boxes, each switch being identified with a particular reaction experienced by the holder of the box, manual means for operating the several switches, separate electric circuits each arranged to be closed upon operation of one of said switches, fixed resistance means in each of said boxes, connections from said resistance means to said switches serving to place a fixed resistance of predetermined high value in one of said circuits upon operation of the related switch, electrical interconnections between the switch boxes serving to place in parallel said fixed resistances in all of said boxes which have corresponding switches closed in the circuits closed by said switches, three common resistors of predetermined low value in each of said circuits arranged in series with the fixed resistances which are connected in parallel, means for measuring and recording the drop of potential across one of said common resistors in each of said circuits, a first resistance element of relatively high value in series with two of said common resistors in each of a plurality of said circuits, said resistance elements being of predetermined weighted relationship and having one of their terminals interconnected, a second resistance element of relatively high value in series with the three common resistors in each of said circuits, said second resistance elements being of the same predetermined value and having one of their terminals interconnected, and means for separately measuring and recording the drop of potential through all of said first resistance elements and their related resistors and through all of said second resistance elements and their related resistors.

13. A method of determining audience reaction to a performance which comprises establishing a plurality of circuits through the audience each identified with a particular reaction to the performance, said circuits collectively identifying a full range of reactions experienced by members of the audience, varying the current flow through each of said circuits in the course of the performance in accordance with the varying reactions of the members of the audience under control of said members, each member of the audience exerting a control over one or another of said circuits at all times, and determining the variations in current flow through each of said circuits as the performance progresses.

14. A method of determining audience reaction to a performance which comprises establishing a plurality of circuits through the audience each identified with a particular reaction to the performance, said circuits collectively identifying a full range of reactions experienced by members of the audience, varying the current flow through each of said circuits in the course of the performance by introducing a variable number of fixed high resistances in parallel in a portion of each circuit in accordance with the varying reactions of the members of the audience and under control of said members, each member of the audience exerting a control over one or another of said circuits at all times, and determining the variations in current flow through each of said circuits as the performance progresses.

15. A method of determining audience reaction to a performance which comprises establishing a plurality of circuits through the audience each identified with a particular reaction to the performance, said circuits collectively identifying a full range of reactions experienced by members of the audience, varying the current flow through each of said circuits in the course of the performance by introducing a variable number of fixed high resistances in parallel in a portion of each circuit in accordance with the varying reactions of the members of the audience and under control of said members, each member of the audience exerting a control over one or another of said circuits at all times, determining the variations in current flow through each of said circuits as the performance progresses by measuring the voltage drop through a portion of each circuit which is of a fixed low resistance, shunting a part of the current in each of said circuits through a resistance of substantially higher value than said fixed low resistance, and periodically determining the drop of potential through all of said portions of said circuits and through said resistances of substantially higher value.

References Cited in the file of this patent

UNITED STATES PATENTS 2,529,519   Schwerin ---------------- Nov. 14, 1950